March 12, 1968     J. MERLES     3,373,014
METHOD FOR PURIFICATION OF ALUMINUM
Filed July 14, 1964     2 Sheets-Sheet 1

INVENTOR
Jacques Merles
by McDougall, Hersh and Scott
Att'ys

March 12, 1968  J. MERLES  3,373,014
METHOD FOR PURIFICATION OF ALUMINUM
Filed July 14, 1964  2 Sheets-Sheet 2

INVENTOR
Jacques Merles
by McDougall, Hersh
and Scott
attys

United States Patent Office 3,373,014
Patented Mar. 12, 1968

3,373,014
METHOD FOR PURIFICATION OF ALUMINUM
Jacques Merles, Tarascon-sur-Ariege, France, assignor to Pechiney Compagnie de Produits Chimiques et Electrometallurgiques, Paris, France
Filed July 14, 1964, Ser. No. 382,600
Claims priority, application France, July 19, 1963, 941,998
27 Claims. (Cl. 75—68)

This invention relates to the purification of aluminum and more particularly to the method and means for the purification of aluminum by liquid mercury.

In United States Patent No. 2,198,673, description is made of purification of aluminum, such as impure aluminum in a finely divided state, by solution of the impure aluminum in hot liquid mercury to dissolve aluminum and leave the impurities in an undissolved state for subsequent separation by decantation and then distillation of the solution to separate the mercury from the dissolved aluminum. The described procedures are well carried out in an inert atmosphere at subatmospheric pressure.

In "Fiat, Review of German Sciences, Metallkunde 39–45, Borschers and Schmidt Process," description is made of the separation of aluminum from its solution in mercury by first cooling to precipitate aluminum enriched crystals and thereafter performing a preliminary mechanical refining step and then effecting complete removal of the mercury, as by distillation.

In "Beliaiev, Firsanova and Rapoporte, Electro-metallurgy of Aluminum, Moscow 1953," pp. 675–684, description is made of the extraction of aluminum from the pasty mass of aluminum amalgam obtained by crystallization by means of a screw conveyor or by compression in a hydraulic press.

The procedures described in the aforementioned articles and also in German Patent No. 846,796 depend upon solution of the aluminum in mercury in an autoclave maintained at a pressure of 20 to 35 atmospheres and a temperature within the range of 500° to 650° C. to maximize the solution of aluminum.

The described processes of extraction, which operate under high pressure, are subject to a number of technological difficulties. The steel of which such equipment is formed must be capable of withstanding high temperatures and pressures as well as the corrosive action of the aluminum amalgam. The thicknesses of the steel walls militate against the desirable rate of heat exchange. The conditions of pressure, temperature and liquid levels call for complex and delicate controls. Aside from the foregoing, a principal difficulty resides in the inability to achieve sufficient tightness in the equipment to resist the escape of poisonous vapors of mercury, especially when operating under the positive pressure conditions with the equipment and especially between the joints, as in the areas of extension of rotating shafts through the walls of the equipment. Difficulties arise also in maintenance of fluid and vapor tightness at the inlets and the outlets used for the introduction or removal of material in the system.

Difficulty is also experienced in the maintenance of high temperatures and pressures in uniform distribution for optimum solution of the aluminum and separation of impurities. The presence of hot spots has been found to cause vaporization while the presence of cold spots leads to condensations thereby to interfere with the efficiency of operation of the equipment and control of the process.

Aluminum in the form of chips, shavings or other divided particles of impure aluminum dissolves so slowly in mercury at near boiling point temperature and atmospheric pressure as to make the described process commercially impractical.

Various pretreatments have been applied in the effort to make impure aluminum more readily soluble in mercury such as in the pre-engagement of the mercury with an alloy of aluminum, as described in German Patent No. 840,765, or treatment of the impure aluminum with metal salts or other reagents which react with aluminum oxide at temperatures of about 360° C., as described in Fiat, supra, but these have not been effective to overcome the deficiencies as previously pointed out.

It is an object of this invention to provide a method and means for the purification of aluminum by the use of liquid mercury to separate impurities from the aluminum and it is a related object to provide a method and means of the type described which is free of any of the deficiencies of the processes previously described.

An object of this invention is to provide a process and means for the production of purified aluminum by solution of the impure aluminum in hot mercury, preferably in the absence of air, elimination of undissolved impurities, cooling to precipitate crystals of aluminum amalgam, and vaporizing off the mercury from the separated amalgam to leave purified aluminum, and it is a related object to carry out the steps of solution, elimination of impurities, crystallization and separation of the amalgam to free aluminum in a continuous operation.

A further object is to effect dissolution of aluminum from the impure aluminum by trickling liquid mercury over the impure aluminum at a temperature within the range of 300° to 420° C., and preferably at a temperature within the range of 340° to 380° C., wherein the impure aluminum is treated while in a solid state, such as in the form of sheets, wires, turnings, chips, granules and waste from the conventional treatments used with alloy and alloys of aluminum or semi-finished products and the like, which materials may or may not have been subjected to pretreatment, with the impure aluminum preferably being maintained in a stationary bed relative to the dissolving mercury.

These and other objects and advantages of this invention will hereinafter appear and for purposes of illustration, but not of limitation, and embodiment of the invention is shown in the accompanying drawings, in which—

Figure 1:
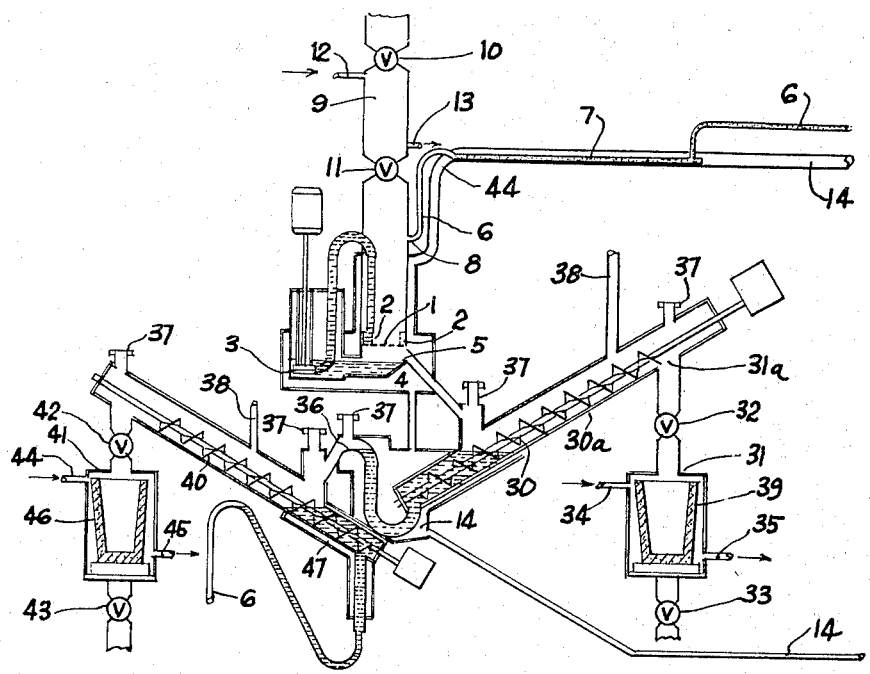
FIG. 1 is a diagrammatic view of a complete installation embodying the practice of this invention.

Referring now to the drawings, in FIG. 1, the numeral 1 represents the grid on which the impure aluminum to be dissolved is adapted to rest, 2 represents the orifices through which the mercury jets serving as solvent escape, 3 is the mercury pump of the dissolving installation, 4 is the mercury-collecting tank at the base of the dissolving column, 5 is the overflow of this tank, 6 is the circuit of liquid mercury serving as solvent, 7 is the part of this circuit in which the heating of this mercury is carried out for dissolving purposes, 8 is the opening of this circuit into the dissolving column, 9 is the feed chamber for the intermittent introduction of the impure aluminum, 10 and 11 are the inlet and outlet valves of the feed chamber, 12 and 13 represent the inlet and outlet for the nitrogen or other inert gas serving to flush out the air of the feed chamber, and 14 is the circuit of mercury saturating vapor intended for the heating of the installation. 30 is the extraction screw mounted for rotational movement in the tubular housing 30ª for the impurities, 31 is the receiver which communicates with the opening 31ª in the upper end portion of the screw housing 30ª through which the impurities fall for recovering the impurities, 32 and 33 are the upper and lower valves of this receiver, 34 and 35 represent the inlet and the outlet of the flushing nitrogen or other inert gas for flushing air from the receiver, 39 is the plumbago or graphite crucible in which the impurities are collected, 36 is the overflow for the flow of the aluminum amalgam solution freed from impurities, 37 are viewing arrangements for observation of the interior of the screw conveyor, and 38 is a conduit communicating with a nitrogen atmosphere. 40 is the extraction screw for the amalgam crystallized by cooling, 47 is the double water-cooling jacket for the purified solution, 41 is the lock chamber for receiving the crystallized aluminum amalgam, 42 and 43 are the upper and lower inlet and outlet valves of this chamber, 44 and 45 are the inlet and the outlet for the flushing nitrogen or other inert gas for flushing air from the chamber, and 46 is the graphite crucible in which the crystallized amalgam is collected.

Figure 2:
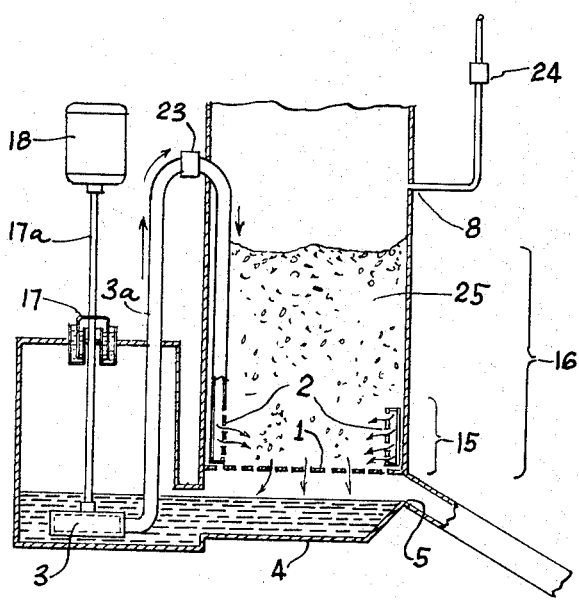
FIG. 2 is a schematic sectional elevational view of a portion of the installation of FIG. 1 illustrating means for the solution of aluminum in mercury in accordance with the practice of this invention.

In FIG. 2, 15 indicates the height of the column of impure aluminum sprinkled with the mercury jets serving as solvent, 16 represents the height of the column of the impure aluminum 25 in the chamber, 17 is the mercury hydraulic joint for the shaft 17ª interconnecting the pump 3 with the drive motor 18, while 23 and 24 are flow meters. The double jacket of the dissolving apparatus is not shown in FIG. 2.

Figure 3:
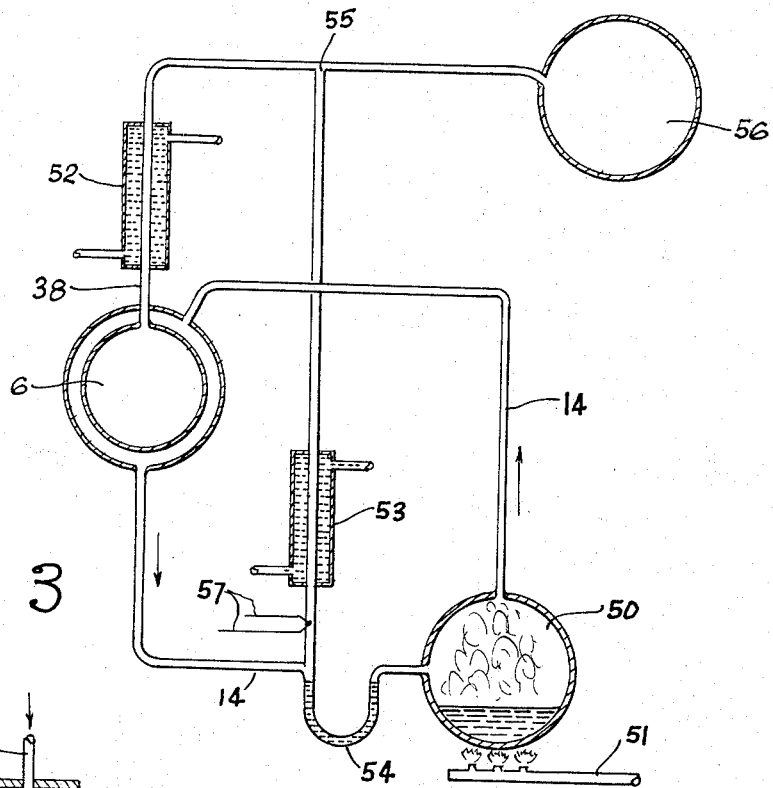
FIG. 3 is a schematic view of the arrangement of elements for heating the mercury and for introducing the heated mercury into the process circuit.

In FIG. 3, the reference 6 indicates the cycle of liquid mercury which serves as a solvent. Above the liquid mercury, there is a nitrogen atmosphere which communicates by way of the passage 38 with the gasometer 56.

The boiling mercury is disposed within a boiler 50 for feeding the passage 14 with the saturating mercury vapor for heating the installation. Gas heaters 51 are used for heating the mercury in the boiler 50. The numerals 52 and 53 represent containers that prevent the mercury vapors in the passages 38 and 14 from mixing one with the other and also to prevent the vapors from reaching the gasometer 56 filled with nitrogen at the desired pressure. 55 is the junction point of the passages 38 and 14. A syphon 54, filled with mercury, causes the saturating mercury vapors to flow through the passage 14 in the direction of the arrow. The numeral 57 is a thermocouple which controls the heating power of the boiler for lowering when the reflux from the condenser 53 is too great.

Figure 4:
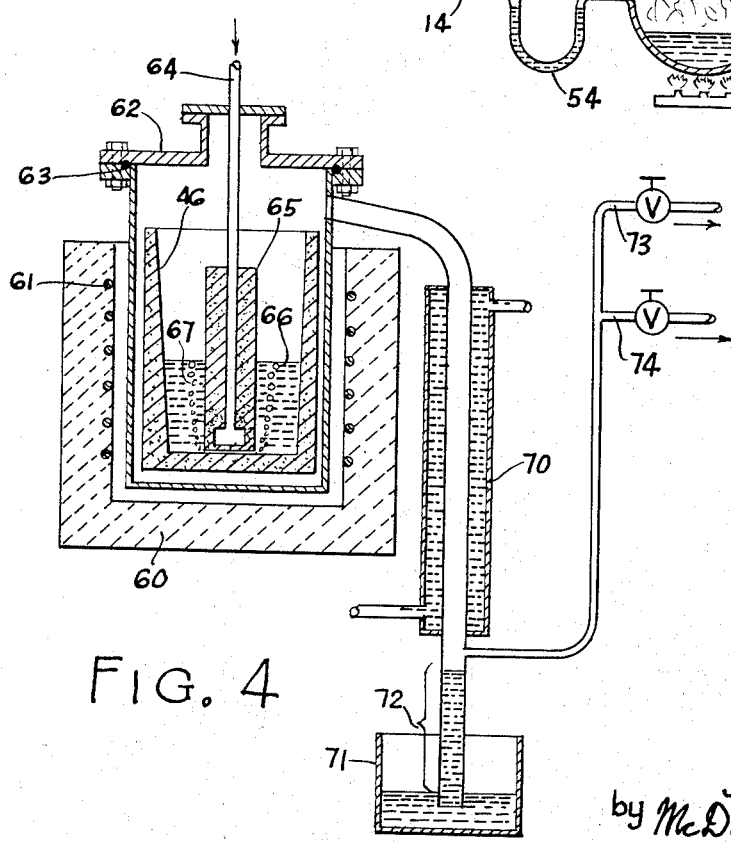
FIG. 4 is a schematic elevational view of the arrangement of elements for the removal of mercury by distillation.

In FIG. 4, the reference 60 indicates an electric furnace, 61 are the resistance heaters of this furnace, 62 is the cover of the distallation vessel, 63 is the seal of this cover, 64 is an argon pipe extending through the cover, 65 is a graphite plunger, 66 is the mass of liquid aluminum contained in the graphite crucible 46, and 67 is the argon gas bubbling up through the molten bath, 70 is a condenser for the mercury vapors, 71 is the tank for receiving condensed liquid mercury, 72 is the height of the barometric column filled with cold mercury when the apparatus is under vacuum, 73 is the connection with the source of vacuum such as a vacuum pump and 74 is the argon outlet. The heat insulation arrangements have not been shown in the figure. The furnace assembly can be made fluid-tight and can also be placed under vacuum.

According to a preferred form of the invention (FIG. 2), the impure aluminum 25 is placed in a substantially vertical column. It is held at the bottom of this column by any means known per se, preferably in a grid 1. The liquid mercury underneath this column in a tank 4 is recycled from the tank 4 through the pipe 3ª to the column 15 by means of a pump 3, the delivery Q of which is measured by the flow meter 23. In practice, the liquid mercury is recycled several times through this circuit 1–4–3–23, indicated by the arrows in FIG. 2 for trickling through the column of impure aluminum before being fed into the main circuit comprising the successive stages already described in the general definition of the invention, namely: the dissolution, the elimination of impurities (see FIG. 1, reference 30), and the separation of the amalgam crystals (see FIG. 1, references 40 and 47) obtained by cooling the solution thus purified.

According to another preferred form of the invention, the stream of mercury, previously rid by any known means of the soluble impurities it may contain, is injected into the bottom of the mass 25 of impure aluminum to be dissolved, by centripetal jets which leave orifices 2 arranged at the base of the dissolving column. The height 16 of the stock of impure aluminum should be at least equal to the height 15 of its trickling zone.

The tank 14 allows a portion $q$ of the impure solution of aluminum in mercury to be displased by way of the overflow 5; the portion $q$ of this solution corresponds to the amount of fresh mercury introduced into the system as measured by the flow meter 24 and introduced at 8 into the dissolving column.

According to the invention, the ratio $Q/q$ between the delivery or recycle of the secondary trickling circuit and the portion $q$ removed in the overflow circuit is generally chosen to be between 3 and 50, depending upon the dissolving temperature, the state of division of the impure aluminum and the speed of the unitary jets leaving the orifices 2. Preferably, this ratio is between 10 and 25 when working in the region of 360° C. with impure aluminum in the form of chips.

According to the invention, it is possible to vary at will the strength of the solution of aluminum in mercury by selecting the value of the said ratio $Q/q$. A strength very close to saturation is easily obtained by making this ratio sufficiently large; it is also possible in an accurate and reproducible manner to obtain a strength below that of saturation by reducing the said ratio.

Bearing in mind the patents and literature already referred to above, it was unexpected that it would be possible for aluminum in the solid state which had not undergone any kind of pretreatment to be obtained as a solution in the mercury. It is even more surprising that such a solution quickly reaches saturation point and as a consequence makes it possible to achieve in a simple, economic and practically safe manner relatively large deliveries of a practtically saturated solution of aluminum in mercury without having to provide any means for regulating the rate of flow of the aluminum.

In accordance with the new process, the presence of undissolved aluminum in the solution at the outlet of the dissolving installation is practically avoided, even with a saturated solution, whereas, in the prior processes, one had to be satisfied with dissolving a percentage of aluminum in a solution below saturation at corresponding temperatures.

On the other hand, in accordance with the practice of this invention, the flow of the solvent mercury is preferably effected simply by gravity between the dissolving apparatus and the apparatus for the elimination of impurities, and similarly between this latter and the crystallization apparatus, thereby to dispense with any automatic regulation of the levels of the solvent mercury. Thus robust equipment can be used which is subject to very little interruption and this is particularly important in a process for purifying aluminum with mercury.

According to one particular form of the invention, the dissolving temperature is between approximately 340° and 360° C., under substantially atmospheric pressure.

According to one preferred form of the invention, impure aluminum containing 99% aluminum is purified to a refined aluminum containing 99.99% aluminum.

It is advantageous, according to the invention, to make use of a pump 3 immersed in the bath of liquid aluminum with a vertical shaft 3ª (see FIG. 2) as the pump for the recycling of the mercury in the column. The passage of the pump shaft through the wall of the dissolving apparatus is thus in the atmosphere formed of the vapors of this apparatus and not in liquid mercury. According to one embodiment of this passage of the pump shaft through the wall, there is used a mercury hydraulic joint 17. Nevertheless, any other fluid-tight joints for this shaft can be used, such as a stuffing box with a gland or mechanical packing embedded in oil, etc.

According to one preferred form of the invention, it is possible to use a sealed chamber 9 for introducing the impure aluminum in solid form into the dissolving apparatus. As valves for this chamber, it is possible to use valves which are known per se formed by a sleeve of elastically deformable rubber. The valve is closed by applying a pressure (for example compressed air) to the exterior of this sleeve, which is thereby flattened. This valve ensures a hermetic sealing, even in the presence of small pieces of aluminum between the faces of the sleeve. The application of the valves, as described above, to the purification of aluminum with mercury thus represents a technological advance in this field.

This sealed chamber is flushed with an inert gas such as nitrogen, argon, etc., as shown in FIG. 1, references 12 and 13. It is also possible to provide a vacuum in the said chamber. According to the invention, by the circulation of nitrogen for flushing the air from the chamber, oxygen can be substantially completely eliminated, so that only less than 0.5 part per million of oxygen, for example, still remains in the said chamber.

The present invention thus makes it possible to overcome the difficulties previously referred to when it is desired to obtain, above the solution of aluminum in mercury, an atmosphere which is relatively free from oxygen, despite the intermittent introduction of the crude aluminum into the circuit.

According to one preferred form of the new process, the establishment and maintenance of the temperature of the solvent mercury may be assured by a heat-conveying fluid, such as an organic liquid, a metal or alloy in the liquid state and preferably mercury, circulating in a double jacket of the installation to be heated. It is desirable, according to the invention, for the mercury employed as solvent and that described as the heating mercury to be kept under inert gas at substantially the same pressure.

It is desirable to arrange a reflux condenser on the degasifying conduits of each circuit or cycle and thus to create, between these two cycles, a junction protected from mercury vapors by the said condensers, and connected to the said common inert gas atmosphere, as shown in FIG. 3, previously referred to. The gasometer 56 can be replaced by any apparatus ensuring a constant pressure of inert gas.

The new application to the purification of aluminum by mercury of a heat-carrying fluid, a heating method which is well known per se, has enabled me to obtain particularly uniform temperatures at all points of the chamber to be heated, with the temperatures remaining relatively constant for any desired length of time.

It is very difficult if not impossible to obtain such a uniformity and constancy of temperature by direct heating, particularly in chambers of relatively large dimensions and of complicated shapes, except by employing an electrical heating provided with a complex control system.

The application of a heat-carrying liquid has enabled me to use as heating means the combustion of natural gases, oil, etc. These products constitute heat sources which are generally more ecomonical and have a better yield of conversion into useful heat than the electricity which is produced to a considerable part from central heating plants.

The heating by a circulation of mercury which is under substantially the same pressure as the solvent mercury and in the state of saturating vapor constitutes a particularly simple and efficient means for establishing and maintaining the temperature of the solvent mercury.

Because of the use of saturating vapor, it becomes possible to reduce the exchange surfaces and to regulate the temperatures with considerable accuracy. On the other hand, the use of the thermocouple 57 (see the explanations hereinbefore given in connection with FIG. 3) controls the quantity of calories consumed to that necessary for the consumption.

According to the invention, the solvent mercury can be brought to the temperature required for the dissolution before it reaches the dissolving column by means of the heating mercury circuit.

According to the invention, the impurities which have remained insoluble when the aluminum is dissolved in the mercury can be separated out by decantation and skimming and the solution of aluminum in the mercury subjected to the separation of the impurities can be kept at the required temperature by means of a heat-carrying fluid. The separation of the impurities can be effected at the same temperature as the dissolution and it is possible for maintaining the temperature at the time of this separation to use the same heating mercury circuit as for the dissolution.

In accordance with the invention, the impurities can be removed from the aluminum solution in mercury by means of one or more Archimedian screws which are slightly inclined relatively to the horizontal. The inclination can be between 4° and 40° and preferably in the region of 10° to 15°. These screws preferably turn at a very low speed which in practice is between 0.1 and 1 revolution per minute. It is advantageous for the diameter of the impurity-separating chamber (inside which the screw or screws turn) to have a diameter which is generally slightly larger than that of the screw or screws, in such a way that these latter sweep over practically all the free surface of the solution in order to free it from floating impurities.

The screw blades can be formed with grooves in their periphery to facilitate the draining. It is possible to employ two practically identical screws of opposite pitch and parallel axes which are fitted one within the other and turn in opposite directions, so that the impurities are continuously detached from the surface of the said screws.

It is also possible, according to the invention, to free the solution of aluminum in mercury from insoluble impurities by filtration, the said filtration preferably taking place after the decantation.

The impurities are preferably eliminated in a crucible 39 contained in a sealed receiver 31 equipped for being flushed with an inert gas and which may also be equipped for vacuum. The valves of this sealed receiver may, for example, be the rubber sleeve valves already described above. It may be expedient to use a mercury hydraulic joint as lower valve.

According to another feature of the invention, the solution freed from the impurities is cooled by a fluid which is circulating in a double jacket 47 of the crystallization apparatus. In accordance with the invention, the said solution freed from impurities can be cooled to normal temperature or to about 100° or to a higher temperature. In any case, the cooling temperature is generally not higher than 160° C.

As the cooling fluid, use can be made of cold water, when it is desired to cool to ambient temperature, boiling water for a cooling temperature of about 100° C. and boiling chlorobenzene if it is desired to cool to 132° C., boiling bromobenzene for 155° C., etc.

The specific energy consumption per kilo of purified aluminum in accordance with the new process is small, as will be hereinafter set forth.

The saturated solution of aluminum in mercury contains 0.78% by weight of aluminum at 400°, 0.35% at 360° and 0.034% at 150° C. and is practically free from aluminum at normal temperature. An immediate calculation shows that with a heating yield of 70% which, as already indicated above, can easily be achieved, the heating costs (in Kcal. coming from coal, gas or fuel energy much cheaper than electricity) between 360° and 20° C., substantially the equivalent of 5.3 kwh. per kg. of purified aluminum, and substantially the equivalent of 2 kwh. per kg. between 400° C. and 150° C., the starting material being 99% aluminum. To these energy consumptions for the dissolution is obviously added the energy expended for the purification of the amalgam by distillation, which corresponds in each case to the equivalent of about 2.5 to 3 kwh. per kg. These figures show the economic interest of the new process, when they are compared with the specific energy consumptions in the other processes: for example, 18 kwh. per kg. of 99.995% aluminum by the electrolytic process starting with 99.5% aluminum (the kwh. values are evaluated as high voltage energy). It is to be emphasized that when departing from the temperature range defined by the invention, the complications due to temperatures higher than 420° C. and to the corresponding pressures are such that the process becomes impractical.

For withdrawing the crystals of purified amalgam separated by cooling, there is used an Archimedian screw system 40 (FIG. 1) which corresponds to its essential features to that already described above for withdrawing the impurities.

I have found that the simple treatment of draining the crystals of purified amalgam floating on the surface, which draining is improved by grooves formed on the peripheries of the said Archimedian screws, is sufficient to reduce the amount of merucry entrained and correspondingly increase the amount of aluminum in the crystals from 5% to about 15%.

The crystals of purified amalgam are preferably collected in a crucible 46 contained in a lock chamber 41. The said chamber and the said crucible correspond in their essential features to those already described above for the recovery of the impurities.

Viewing arrangements 37 (FIG. 1) enable the different phases during manufacture to be supervised.

According to the invention, the crucible containing the impurities or the crucible containing the purified amalgam is extracted from the lock chamber, placed in a furnace and subjected to distillation in the absence of oxygen. There are thus recovered respectively, the mercury entrained by the impurities or the mercury entrained by the purified amalgam. The distillation apparatus can be closed by a joint 63 (FIG. 4).

In order to eliminate the traces of mercury retained in the aluminum after the major part of the mercury has been recovered, it is possible, according to the invention, for this aluminum in molten state to be treated under vacuum. This latter treatment may be replaced or completed by a flushing by means of an appropriate gas; however, I have discovered that the most efficient treatment for the elimination of the last traces of mercury consisting in causing a suitable gas to bubble into the liquid aluminum and this can, for example, be effected by the arrangement shown in FIG. 4, or by any other bubbling arrangement. As a suitable gas for this bubbling operation, it is possible to use argon, or nitrogen, or a mixture of nitrogen and chlorine, or chlorine itself, etc.

The bubbling described above makes it possible quickly to eliminate the last traces of mercury by means of relatively very small quantities of unreactive gas. Because of the small quantities of this gas, it is not necessary for it to be recycled. This simplifies the treatment for the extraction of mercury at the outlet of the apparatus. This treatment can consist in this gas being simply washed with sprayed water before being returned into the atmosphere.

This treatment for removing mercury by bubbling an appropriate gas can also be applied to industrial aluminum alloys containing mercury, if it is desired to lower or practically cancel out the mercury content thereof. Owing to the above treatments for ridding the aluminum of any trace of mercury, it has been possible to regularly obtain mercury contents not exceeding 0.2 part by weight of mercury for 1 million parts of aluminum.

The following non-limitative examples are to serve to illustrate the invention:

EXAMPLE 1

2.5 kg. per second of mercury flowing through a continuous cycle 6 (FIG. 1) are heated under atmospheric pressure from a temperature of 20° C. to a temperature of 360° C. in a heat exchanger 7, of which the heat-carrying agent flowing through a cycle 14 is the saturating vapor of mercury under atmospheric pressure. The heated mercury is introduced by gravity into a tank 4 containing a practically saturated solution of aluminum in mercury at atmospheric pressure and at 360° C. (0.35%).

The mercury of the tank 4 is continuously recycled into the secondary circuit 4–3–23–1 at a rate of 50 kg. per second over aluminum chips with a content of 99.4% by weight of aluminum.

The dissolving chamber is equipped with a double jacket, in which circulates the same heat-carrying fluid as in the heat exchanger. The shaft of the pump 3 (FIG. 2) extends through the partition of the dissolving apparatus by way of a mercury hydraulic joint 17.

The solvent mercury circuit 6 and the saturated mercury vapor circuit (intended for the heating of 6) are connected to one another according to FIG. 3 and operate under nitrogen atmospheric pressure. From the overflow 5, a practically saturated solution of aluminum in mercury flows at a rate of 2.5 kg. per second. This solution carries with it the insoluble impurities of aluminum and a few small grains of aluminum which are carried through the grid 1 and which float on the surface of said solution; it is poured into a decanting device which is itself also equipped with a double jacket directly connected to that of the dissolving chamber. The decanting device is provided with a syphon through which flows the saturated solution of aluminum in mercury, freed from its impurities. The impurities are removed by an Archimedian screw 30 at an angle of 10° to the horizontal, this screw having a diameter of 200 mm. and rotating at 0.2 revolution per minute in a generally cylindrical chamber which has an internal diameter of 202 mm. The impurities are accumulated in the crucible 39 contained in the lock chamber 31 and are periodically distilled in order to recover the mercury therefrom.

The practically saturated solution flows through the overflow 36 into a crystallization apparatus provided with a water-cooled double jacket 47 to cool the solution to a temperature of about 100° C. and in which the aluminum crystallizes. Two oblique screws 40 skim over the entire surface and carry an amalgam containing 15% of aluminum and 85% mercury into the graphite crucible 46, where it accumulates.

Viewing devices 37 enable the various phases of the operation to be supervised. There are thus produced 200 kg. per hour of this amalgam.

The crucible is periodically removed. The lower opening of the lock chamber is formed by a mercury hydraulic joint, which enables the crucible to be easily withdrawn. This latter is subjected to distillation in a separate furnace according to FIG. 4. When the distillation of the mercury at atmospheric pressure in an inert gas is practically achieved, there remain about 500 parts by weight per million of mercury in the aluminum. Argon is then caused to bubble at a rate of 1 liter per minute through this liquid aluminum contained in the crucible, by means of a graphite pipe, the end of which is porous. The production of the furnace is 30 kg. per hour of refined aluminum with a content of 99.993%.

EXAMPLE 2

The solvent mercury circuit 6 and the heating saturated mercury vapor circuit 14 operate under an excess pressure of 1 kg./cm.$^2$ of nitrogen with respect to atmospheric pressure (FIG. 3). The equipment is substantially the same as that of Example 1; however, the viewing devices 37 (FIG. 1) are omitted; the mercury hydraulic joint 17 (FIG. 2) of the pump 3 and the hydraulic joints 33 and 43 of the lock members (FIG. 1) are adapted for working under a pressure of 76 cm. of mercury superpressure. The rate of flow in the solvent mercury circuit and in the secondary circuit 3–23–1–5 (FIG. 2) are the same as in Example 1.

The double jacket 47 (FIG. 1) of the crystallization apparatus is traversed by bromobenzene at boiling point (temperature 155° C.). The refined aluminum has the same content as that according to Example 1, also starting from 99.4% aluminum as starting material. However, the hourly production rate is doubled with respect to Example 1 for the same crystallization, and the specific energy consumption per kg. of refined aluminum produced is only approximately 40% of that according to Example 1, as has already been explained above.

It will be understood that changes may be made in the details of formulation and operation without departing from the spirit of the invention, especially as defined in the following claims.

I claim:

1. In the process of purification of aluminum by treatment of impure aluminum with mercury in a solution zone to dissolve out aluminum while impurities remain undissolved including a main stream comprising the treatment of the impure aluminum in a solid state with liquid mercury at elevated temperature to dissolve aluminum in the mercury, separating the formed solution of aluminum in mercury from undissolved impurities, cooling the solution of aluminum in mercury to form the solution into a crystalline phase of amalgam crystals and a liquid phase of mercury with aluminum dissolved therein separating the amalgam crystals from the remainder and then removing mercury by vaporization from the amalgam crystals to leave purified aluminum, and a secondary cycle comprising the step which includes the portion of the main stream of flowing liquid mercury into contact with the solid particles of impure aluminum to dissolve out aluminum, and which includes the step of draining the liquid mercury with aluminum dissolved therein from the impure aluminum, recycling the drained liquid mercury for flowing into contact with the solid particles of impure aluminum and repeating the secondary cycle for a number of times, continuously bleeding a fraction of the drainage of the liquid mercury with the aluminum dissolved therein to the main stream for separation of undissolved impurities and for separation of dissolved aluminum, and adding liquid mercury to the secondary cycle in an amount corresponding to the amount removed from the secondary cycle into the main stream in which the main stream and secondary cycle are carried out as a continuous operation.

2. The process as claimed in claim 1 in which the liquid mercury is introduced into the column of impure aluminum by jet streams for flow into contact with the impure aluminum.

3. The process as claimed in claim 1 which includes the step of maintaining the solution zone under inert atmosphere.

4. The process as claimed in claim 1 in which the impure aluminum contains at least 99% by weight of aluminum.

5. The process as claimed in claim 1 which includes the step of introducing impure aluminum into the solution zone from a sealed feed zone in communication with the solution zone.

6. The process as claimed in claim 1 wherein the portion bled from the secondary cycle into the main stream is caused to flow gravitationally from the main stream to the separation zone for the separation of undissolved impurities and to the cooling zone for crystallization of amalgam.

7. The process as claimed in claim 1 in which undissolved impurities float on the surface of the liquid mercury having aluminum dissolved therein and which includes the step of separating the undissolved impurities by skimming the impurities from the top of the liquid.

8. The process as claimed in claim 7 in which the undissolved impurities are removed from the dissolving liquid by a separating screw operating within a housing at an angle of 4° to 40°.

9. The process as claimed in claim 1 in which the portion bled from the secondary cycle into the main stream is caused to flow gravitationally from the main stream to the separation zone for the separation of undissolved impurities and in which the undissolved impurities float to the surface of the liquid mercury having aluminum dissolved therein and which includes the step of separating the undissolved impurities from the solution of aluminum in mercury by filtration.

10. The process as claimed in claim 1 in which the crystals of amalgam are separated from the remainder of the liquid by a screw separator operating within a housing at an angle of 4° to 40°.

11. The process as claimed in claim 1 which includes collecting the separated crystallized amalgam in a receiver, distilling the mercury from the amalgam to leave substantially a purified aluminum and maintaining an inert atmosphere during the collecting and distilling steps.

12. The process as claimed in claim 11 which includes the step of removing the last traces of mercury from the purified aluminum by a vacuum distillation.

13. The process as claimed in claim 11 in which the space above the purified aluminum is flushed with an inert gas for removal of traces of mercury.

14. The process as claimed in claim 1 in which an inert gas is bubbled through the purified aluminum for removal of traces of mercury and for maintaining the inert atmosphere above the aluminum.

15. In the process of purification of aluminum by treatment of impure aluminum with mercury in a solution zone to dissolve out aluminum while impurities remain undissolved including a main stream comprising the treatment of the impure aluminum with liquid mercury at elevated temperature to dissolve aluminum in the mercury, separating the formed solution of aluminum in mercury from undissolved impurities, cooling the solution of aluminum in mercury to form amalgam crystals, separating the amalgam crystals from the remainder of liquid mercury having aluminum dissolved therein, and then removing mercury by vaporization from the amalgam crystals to leave purified aluminum, and a secondary cycle comprising the steps which include the portion of the main stream of flowing liquid mercury into contact with the solid particles of impure aluminum to dissolve out aluminum and which includes the steps of draining the liquid mercury with aluminum dissolved therein from the impure aluminum, recycling the drained liquid mercury for flowing into contact with the solid particles of impure aluminum and repeating the cycle a number of times, continuously bleeding a fraction of the drainage of the liquid mercury with aluminum dissolved therein to the main stream for separation of undissolved impurities and for separation of dissolved aluminum, and adding liquid mercury to the secondary cycle in an amount corresponding to the amount removed from the secondary cycle into the main stream, in which 1/3 to 1/50 of the mercury stream in the secondary cycle is continuously bled into the main stream for subsequent treatment to separate impurities and purified aluminum.

16. In the process of purification of aluminum by treatment of impure aluminum with mercury in a solution zone to dissolve out aluminum while impurities remain undissolved including a main stream comprising the treatment of the impure aluminum with liquid mercury at elevated temperature to dissolve aluminum in the mercury, separating the formed solution of aluminum in mercury from undissolved impurities, cooling the solution of aluminum in mercury to form amalgam crystals, separating the amalgam crystals from the remainder of liquid mercury having aluminum dissolved therein, and then removing mercury by vaporization from the amalgam crystals to leave purified aluminum, and a secondary cycle comprising the steps which include the portion of the main stream of flowing liquid mercury into contact with the solid particles of impure aluminum to dissolve out aluminum and which includes the steps of draining the liquid mercury with aluminum dissolved therein from the impure aluminum, recycling the drained liquid mercury for flowing into contact with the solid particles of impure aluminum and repeating the cycle a number of times, continuously bleeding a fraction of the drainage of the liquid mercury with aluminum dissolved therein to the main stream for separation of undissolved impurities and for separation of dissolved aluminum, and adding liquid mercury to the secondary cycle in an amount corresponding to the amount removed from the secondary cycle into the main stream, in which 1/10 to 1/25 of the mercury stream of the secondary cycle is continuously bled into the main stream for subsequent treatment to separate impurities and purified aluminum.

17. In the process of purification of aluminum by treatment of impure aluminum with mercury in a solution zone to dissolve out aluminum while impurities remain undissolved including a main stream comprising the treatment of the impure aluminum with liquid mercury at elevated temperature to dissolve aluminum in the mercury, separating the formed solution of aluminum in mercury from undissolved impurities, cooling the solution of aluminum in mercury to form amalgam crystals, separating the amalgam crystals from the remainder of liquid mercury having aluminum dissolved therein, and then removing mercury by vaporization from the amalgam crystals to leave purified aluminum, and a secondary cycle comprising the steps which include the portion of the main stream of flowing liquid mercury into contact with the solid particles of impure aluminum to dissolve out aluminum and which includes the steps of draining the liquid mercury with aluminum dissolved therein from the impure aluminum, recycling the drained liquid mercury for flowing into contact with the solid particles of impure aluminum and repeating the cycle a number of times, continuously bleeding a fraction of the drainage of the liquid mercury with aluminum dissolved therein to the main stream for separation of undissolved impurities and for separation of dissolved aluminum, and adding liquid mercury to the secondary cycle in an amount corresponding to the amount removed from the secondary cycle into the main stream, which includes the step of heating the mercury in the secondary cycle to a temperature within the range of 340° to 360° C. before being brought into contact with the solid impure aluminum and maintaining the pressure at about atmospheric during solution.

18. In the process of purification of aluminum by treatment of impure aluminum with mercury in a solution zone to dissolve out aluminum while impurities remain undissolved including a main stream comprising the treatment of the impure aluminum with liquid mercury at elevated temperature to dissolve aluminum in the mercury, separating the formed solution of aluminum in mercury from undissolved impurities, cooling the solution of aluminum in mercury to form amalgam crystals, separating the amalgam crystals from the remainder of liquid mercury having aluminum dissolved therein, and then removing mercury by vaporization from the amalgam crystals to leave purified aluminum, and a secondary cycle comprising the steps which include the portion of the main stream of flowing liquid mercury into contact with the solid particles of impure aluminum to dissolve out aluminum and which includes the steps of draining the liquid mercury with aluminum dissolved therein from the impure aluminum, recycling the drained liquid mercury for flowing into contact with the solid particles of impure aluminum and repeating the cycle a number of times, continuously bleeding a fraction of the drainage of the liquid mercury with aluminum dissolved therein to the main stream for separation of undissolved impurities and for separation of dissolved aluminum, and adding liquid mercury to the secondary cycle in an amount corresponding to the amount removed from the secondary cycle into the main stream, in which the liquid mercury in the secondary cycle is drained from the impure aluminum into a storage zone and wherein the liquid mercury is recycled from the storage zone to the column of impure aluminum by a means which is completely submerged in the liquid mercury in the storage zone.

19. The process as claimed in claim 18 in which the secondary cycle including the solution zone is maintained within a sealed enclosure and in which the displacement means is operated through a shaft extending outwardly of the sealed enclosure to a driving means located outside of the sealed enclosure.

20. The process as claimed in claim 19 which includes circulating an inert gas through the sealed enclosure for removal of oxygen and for maintaining a non-oxidizing atmosphere therein.

21. In the process of purification of aluminum by treatment of impure aluminum with mercury in a solution zone to dissolve out aluminum while impurities remain undissolved including a main stream comprising the treatment of the impure aluminum with liquid mercury at elevated temperature to dissolve aluminum in the mercury, separating the formed solution of aluminum in mercury from undissolved impurities, cooling the solution of aluminum in mercury to form amalgam crystals, separating the amalgam crystals from the remainder of liquid mercury having aluminum dissolved therein, and then removing mercury by vaporization from the amalgam crystals to leave purified aluminum, and a secondary cycle comprising the steps which include the portion of the main stream of flowing liquid mercury into contact with the solid particles of impure aluminum to dissolve out aluminum and which includes the steps of draining the liquid mercury with aluminum dissolved therein from the impure aluminum, recycling the drained liquid mercury for flowing into contact with the solid particles of impure aluminum and repeating the cycle a number of times, continuously bleeding a fraction of the drainage of the liquid mercury with aluminum dissolved therein to the main stream for separation of undissolved impurities and for separation of dissolved aluminum, and adding liquid mercury to the secondary cycle in an amount corresponding to the amount removed from the secondary cycle into the main stream, in which a heat transfer fluid is circulated in heat exchange relationship with the dissolving mercury in the secondary cycle and the solution zone to maintain the desired temperature of solution.

22. The process as claimed in claim 21 in which the heat transfer liquid is mercury in the form of a saturated vapor.

23. The process as claimed in claim 21 in which the solvent mercury and the heat transfer fluid are maintained under uniform pressure of an inert gas.

24. The process as claimed in claim 21 in which the heat transfer liquid is mercury and in which the mercury heat transfer fluid and the solvent mercury have a common communication zone communicating with an inert gas and wherein the mercury vapors are blocked from passage from secondary cycle to the main stream by condensation.

25. In the process of purification of aluminum by treatment of impure aluminum with mercury in a solution zone to dissolve out aluminum while impurities remain undissolved including a main stream comprising the treatment of the impure aluminum with liquid mercury at elevated temperature to dissolve aluminum in the mercury, separating the formed solution of aluminum in mercury from undissolved impurities, cooling the solution of aluminum in mercury to form amalgam crystals, separating the amalgam crystals from the remainder of liquid mercury having aluminum dissolved therein, and then removing mercury by vaporization from the amalgam crystals to leave purified aluminum, and a secondary cycle comprising the steps which include the portion of the main stream of flowing liquid mercury into contact with the solid particles of impure aluminum to dissolve out aluminum and which includes the steps of draining the liquid mercury with aluminum dissolved therein from the impure aluminum, recycling the drained mercury for flowing into contact with the solid particles of impure aluminum and repeating the cycle a number of times, continuously bleeding a fraction of the drainage of the liquid mercury with aluminum dissolved therein to the main stream for separation of undissolved impurities and for separation of dissolved aluminum, and adding liquid mercury to the secondary cycle in an amount corresponding to the amount removed from the secondary cycle into the main stream, in which the treatment with mercury to dissolve aluminum from the impure aluminum and the separation of impurities from the solution of aluminum dissolved in mercury are carried out at substantially the same temperatures.

26. In the process of purification of aluminum by treatment of impure aluminum with mercury in a solution zone to dissolve out aluminum while impurities remain undissolved including a main stream comprising the treatment of the impure aluminum with liquid mercury at elevated temperature to dissolve aluminum in the mercury, separating the formed solution of aluminum in mercury from undissolved impurities, cooling the solution of aluminum in mercury to form amalgam crystals, separating the amalgam crystals from the remainder of liquid mercury having aluminum dissolved therein, and then removing mercury by vaporization from the amalgam crystals to leave purified aluminum, and a secondary cycle comprising the steps which include the portion of the main stream of flowing liquid mercury into contact with the solid particles of impure aluminum to dissolve out aluminum and which includes the steps of draining the liquid mercury with aluminum dissolved therein from the impure aluminum, recycling the drained liquid mercury for flowing into contact with the solid particles of impure aluminum and repeating the cycle a number of times, continuously bleeding a fraction of the drainage of the liquid mercury with aluminum dissolved therein to the main stream for separation of undissolved impurities and for separation of dissolved aluminum, and adding liquid mercury to the secondary cycle in an amount corresponding to the amount removed from the secondary cycle into the main stream, which includes the step of cooling the solution of aluminum in mercury in the main stream, after separation of undissolved impurities, to a temperature below 160° C. to crystalize amalgam.

27. In the process of purification of aluminum by treatment of impure aluminum with mercury in a solution zone to dissolve out aluminum while impurities remain undissolved including a main stream comprising the treatment of the impure aluminum in a solid state with liquid mercury at an elevated temperature within the range of 300–420° C. to dissolve aluminum in the mercury, separating undissolved impurities from the solution of aluminum in mercury, cooling the separated solution of aluminum in mercury to form amalgam crystals, separating the amalgam crystals from the remainder and then removing mercury by vaporization of the amalgam crystals to leave purified aluminum, and a secondary cycle comprising the steps which include the portion of the main stream of flowing liquid mercury into contact with the solid particles of impure aluminum to dissolve out aluminum, and which includes the step of draining the liquid mercury with aluminum dissolved therein from the impure aluminum, recycling drained liquid mercury for flowing into contact with the solid particles of impure aluminum and repeating the secondary cycle, continuously bleeding a fraction of the drainage of the liquid mercury with aluminum dissolved therein to the main stream for separation of undissolved impurities and for separation of dissolved aluminum, and adding liquid mercury to the secondary cycle in an amount corresponding to the amount bled from the secondary cycle into the main stream.

References Cited

UNITED STATES PATENTS

| | | | |
|---|---|---|---|
| 1,961,135 | 6/1934 | Grahon et al. | 75—81 X |
| 1,200,832 | 10/1916 | Greenway | 23—272.6 X |
| 2,042,661 | 6/1936 | Jeremiassen | 23—273 |
| 2,055,836 | 9/1936 | Cowles | 23—272.6 X |
| 2,154,465 | 4/1939 | Mills et al. | 266—12 |
| 2,279,580 | 4/1942 | Miner | 266—12 |
| 2,331,988 | 10/1943 | Loevenstein. | |
| 2,784,080 | 3/1957 | Schmidt | 75—63 |
| 2,795,498 | 6/1957 | Messner | 75—68 |
| 3,102,805 | 9/1963 | Messner | 75—68 |
| 3,116,998 | 1/1964 | Pagonis | 75—68 X |
| 3,129,066 | 4/1964 | Ambrogi et al. | 23—272.6 X |

DAVID L. RECK, *Primary Examiner.*

HYLAND BIZOT, *Examiner.*

H. W. TARRING, *Assistant Examiner.*